(12) United States Patent
Valentin-Rumpel et al.

(10) Patent No.: US 9,772,243 B2
(45) Date of Patent: Sep. 26, 2017

(54) DIFFERENTIAL PRESSURE SENSOR

(71) Applicant: SAMSON AG, Frankfurt am Main (DE)

(72) Inventors: Frank Valentin-Rumpel, Gross-Umstadt (DE); Sven Rausch, Schoneck (DE)

(73) Assignee: SAMSON AG, Frankfurt am Main (DE)

( * ) Notice: Subject to any disclaimer, the term of this patent is extended or adjusted under 35 U.S.C. 154(b) by 36 days.

(21) Appl. No.: 14/848,790

(22) Filed: Sep. 9, 2015

(65) Prior Publication Data

US 2016/0076958 A1 Mar. 17, 2016

(30) Foreign Application Priority Data

Sep. 15, 2014 (DE) .................. 10 2014 113 281

(51) Int. Cl.
| | |
|---|---|
| *G01L 9/10* | (2006.01) |
| *G01L 9/00* | (2006.01) |
| *G01L 19/02* | (2006.01) |
| *G01L 13/02* | (2006.01) |

(52) U.S. Cl.
CPC ............ *G01L 9/007* (2013.01); *G01L 13/025* (2013.01); *G01L 19/02* (2013.01)

(58) Field of Classification Search
CPC ......... G01L 9/007; G01L 13/025; G01L 7/00; G01L 19/02
USPC .................. 73/722, 717, 716, 715, 700, 728
See application file for complete search history.

(56) References Cited

U.S. PATENT DOCUMENTS

| | | | | | |
|---|---|---|---|---|---|
| 5,115,680 | A | * | 5/1992 | Lew .......................... | G01B 7/16 |
| | | | | | 33/788 |
| 5,317,918 | A | * | 6/1994 | Lew ........................ | G01L 9/003 |
| | | | | | 361/283.3 |

FOREIGN PATENT DOCUMENTS

| | | |
|---|---|---|
| DE | 9300776 U1 | 6/1993 |
| DE | 4317067 A1 | 11/1994 |
| DE | 10113291 A1 | 10/2002 |

(Continued)

OTHER PUBLICATIONS

Helag. Device for detecting linear motion of e.g. actuator element of brake cylinder of e.g. car, has magnet moved relative to anisotropic magneto resistance sensor and whose length is less than magnet travel length along traverse direction, Feb. 27, 2013, DE102013003270.*

(Continued)

*Primary Examiner* — Lisa Caputo
*Assistant Examiner* — Nigel Plumb
(74) *Attorney, Agent, or Firm* — Woodling, Krost and Rust

(57) ABSTRACT

A differential pressure measuring device (10, 50) comprising a housing (18) having two pressure areas (20, 22) which are sealed relative to each other and are separated from each other by a membrane (12, 54). The membrane (12, 54) comprises a pressure plate (14) surrounded by an elastic circumferential area (16) allowing axial movement of the pressure plate (14). An indicator element (24, 56) is permanently connected to the pressure plate (14) and whose position can be evaluated in a non-contact manner by a sensor (34, 58). At least one pair of springs (28, 52) is provided, with one spring (30, 32) each of said pair of springs being located in an allocated pressure area (20, 22).

(Continued)

Figure 1A:
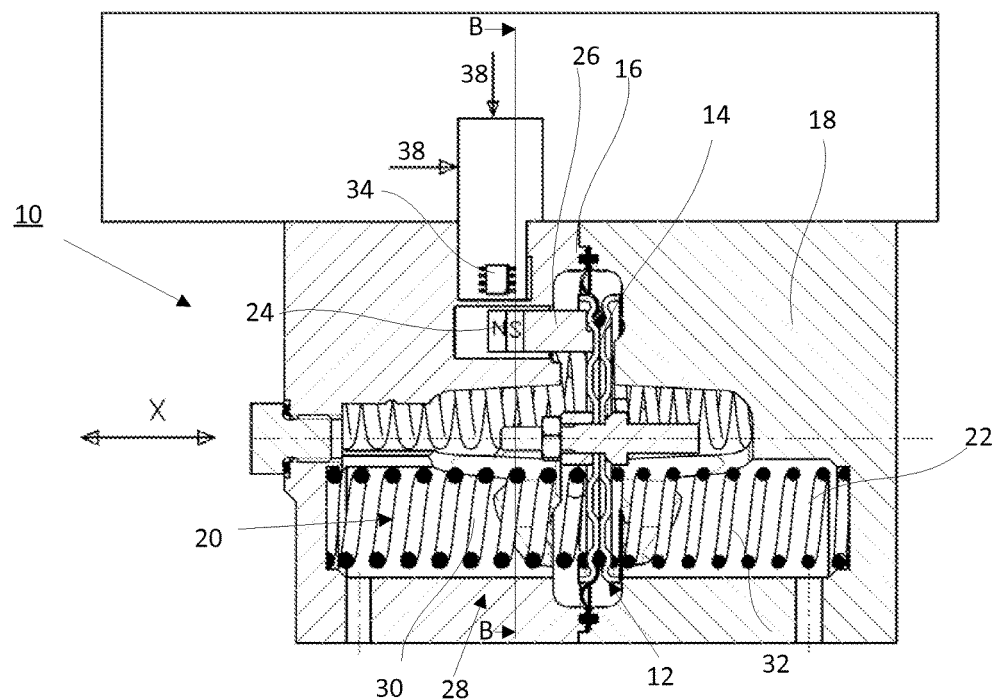

Each spring (30, 32) of said pair of springs (28, 52) exerts an opposing spring force on the pressure plate (14).

10 Claims, 2 Drawing Sheets

(56) References Cited

FOREIGN PATENT DOCUMENTS

DE 102013003270 A1 8/2014
WO 02055978 7/2002

OTHER PUBLICATIONS

Dietfried, Differential pressure sensor and method for differential pressure measurement , Jul. 18, 2002, WO2002055978.*
European Patent Office, Search Report, Jul. 8, 2016, pp. 1-6, Application No. 15185326.4, Applicant: Samson AG.
German Patent Office, Examination Report, Oct. 29, 2014, pp. 1-6, Application No. 102014113281.5, Applicant: Samson AG.
European Patent Office, Search Report, Dec. 1, 2016, pp. 1-11, Application No. 5185326.4, Applicant: Samson AG.

* cited by examiner

DIFFERENTIAL PRESSURE SENSOR

This patent application claims priority to German patent application number 102014113281.5 filed Sep. 15, 2014. German patent application number 102014113281.5 filed Sep. 15, 2014 is incorporated herein in its entirety by reference hereto.

The invention relates to a differential pressure measuring device.

A generic differential pressure measuring device is disclosed in document DE 101 13 291 A1. This differential pressure measuring device comprises a housing with two pressure areas which are sealed relative to each other and are separated from each other by a support element. The differential pressure sensor furthermore comprises a magnetic element which is permanently fixed to the support element and whose position can be determined in a non-contact way by a sensor provided for this purpose. The magnetic element is mounted on a rod which is held by two support elements so as to enable good axial guidance thereof.

For non-contact measurement of the displacement of a pressure plate which is connected to the support element, any changes in the position of the pressure plate will have to occur with utter precision, otherwise there will be considerable measurement errors.

It is the object of the invention to provide a design which allows a more precise setting of the zero position.

The present invention thus provides for a membrane comprising a pressure plate which is surrounded by an elastic peripheral area so as to allow the pressure plate to move axially. Furthermore, at least one pair of springs is provided, with each spring of said pair being located in an associated pressure area, and with the springs of said pair exerting an opposing spring force on said pressure plate.

The opposing spring forces acting on the pressure plate will thus generate a stable state of equilibrium which serves as the zero position. This allows the precise detection of any change in pressure even with minor displacements.

The springs are preferably formed as pressure springs. The opposing forces of the springs of the pair of springs will cause the pressure plate to be clamped and thus fixed in a stable balanced position. As a result, the pressure plate will also be supported by the springs in a radial direction, which springs may be softer in a radial direction than in an axial direction.

Surprisingly, despite the absence of guides for the pressure plate, a relative axial movement of said plate can be measured very precisely by means of the described sensor device as a function of a pressure differential prevailing between the two pressure areas.

The spring stiffness and pre-loads may be chosen so as to obtain a defined stable zero position for pre-selected pressure states.

Preferably, the spring tension may be slightly higher in one pressure area so as to cause the spring to work against a stop provided on the other side of the pressure plate. If there is a respective pressure differential, the stop may be used as an abutment for a zero position.

Additional springs may also be provided on either side of the pressure plate in the respective pressure areas, in addition to the pair of springs. The springs in each pressure area will specifically have the same force direction as the respective springs of the pair of springs associated with the pressure chamber. The pressure areas may for example have a different number of springs allocated to them. Preferably, the springs may be located on the pressure plate along its circumference. It is considered particularly advantageous for example to have one pressure spring in the one pressure chamber, which acts in particular in the middle of the pressure chamber, and three pressure springs in the other pressure chamber, which are specifically located at equal distances on a circumference which is concentric with respect to the center.

According to a preferred embodiment of the invention, at least three pairs of springs are provided. More specifically, these pairs of springs are mounted along a circumference on the radially outer area of the pressure plate. Uniform distribution of the springs in the direction of rotation will ensure a uniform parallel shift of the pressure plate which is notably of circular shape.

Furthermore, it may be envisaged that all springs allocated to a certain pressure area should be of the same type. This will support a rigorous axial displacement of the pressure plate without the risk of a tipping of the pressure plate. Choosing different springs for each pressure chamber will allow adaptation to various applications.

In a simple embodiment, a pair of springs comprises two circumferentially mounted coil springs. Mounting the springs on the circumference will prevent the pressure plate from tipping, in particular when three or more, preferably six, pairs of springs are mounted in this manner.

Preferably, the indicator element may be eccentrically mounted on the pressure plate. This will allow the indicator element to be placed very closely to the wall of the housing of the differential pressure gauge. This will make for a more precise measurement since the sensor will not have to be introduced too far into the housing. For the eccentric mounting of the indicator element, it is essential that tipping of the pressure plate is avoided through the above mentioned steps, or an eccentric mounting will only be made possible if the element is supported in such a way.

The sensor is preferably separated from the pressure area by a wall. The sensor system can thus be designed irrespective of the fluid. The wall thickness has been chosen such that non-contact measurement can be performed by the sensor. The wall may be part of the housing and may for example be provided by making a blind hole in the housing. The sensor can then be inserted into this blind hole relatively close to the wall. If the indicator element is eccentrically mounted, the depth of the blind hole may be kept very small which will be advantageous with regard to installation and maintenance.

According to yet another embodiment of the invention, the indicator element for non-contact position measurement may be a magnet whose magnetic field is detected by an AMR sensor (AMR=anisotropic magneto-resistive effect) or any other magnetic sensor. Inductive or capacitive implementations for non-contact measurements are also possible.

The use of an AMR sensor has the advantage that it will be largely insensitive to a radial change in the distance of the magnet, provided that the magnetic field is suitably aligned. Using an AMR sensor will allow compensation of any tipping of the pressure plate and of the resulting undesired relative radial movement of the magnet. In an embodiment of the invention which is considered particularly advantageous, plural sensor systems, comprising one sensor and an associated indicator element each, may be mounted on the circumference so as to further increase the measuring accuracy.

Choosing a sensor arrangement which has low sensitivity in a radial direction of movement of the pressure plate and high sensitivity in an axial direction as well as selecting the specific combination and design of the springs will yield a precise measuring system with low hysteresis. Hysteresis is also kept low because no additional guides are required.

In yet another embodiment, in the axial direction, the indicator element may be located between the ends of the spring pair which are further away from the pressure plate, and, more specifically, close to the pressure plate. This will allow a compact design of the differential pressure gauge.

Since the relative axial movement between the sensor and the indicator element is of crucial importance, this will affect the mounting of the sensor.

In the intended direction of movement of the indicator element, the sensor may be supported on the housing wall by spring elements. In particular, perpendicularly to the direction of movement, the sensor may also be mounted under spring load. In the third direction, which spans a space, the sensor may be accommodated by means of an element so as to fix it in a centered position.

If the sensor is mounted under spring load, any changes in the position of the sensor as may be caused by the housing expanding under thermal influences, may be prevented.

Additional advantages, features and possible applications of the present invention may be gathered from the description which follows, in which reference is made to the embodiments of the invention which are illustrated in the drawings.

Figure 1B:
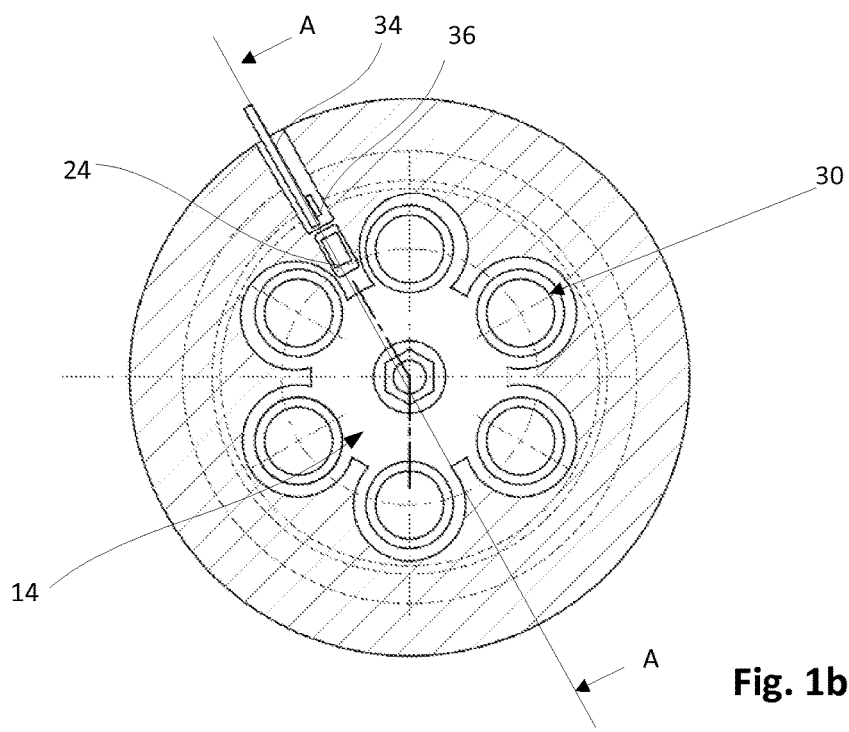
Figure 2:
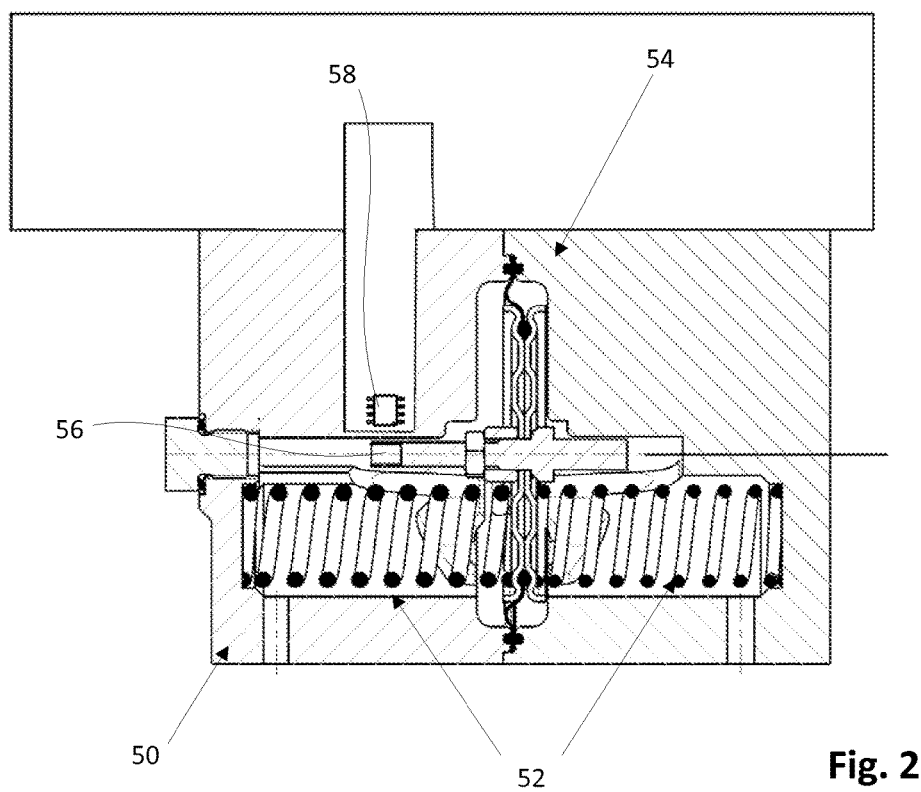

Throughout the description, claims and drawings, those terms and associated reference signs are used as are listed in the List of Reference Signs below. In the drawings, FIG. 1a is a sectional view of a differential pressure measuring device according to the invention;

FIG. 1b is a sectional view taken along lines B-B of a differential pressure measuring device according to the invention, and FIG. 2 is a sectional view of a differential pressure measuring device according to the invention.

FIG. 1a is a sectional view of a differential pressure measuring device 10. The differential pressure measuring device 10 comprises a membrane 12 which includes a pressure plate 14 that is surrounded by an elastic circumferential area 16 which connects the pressure plate 14 to the transmitter housing 18. The membrane 12 seals two pressure areas 20, 22 from each other. Permanently connected to said pressure plate 14 is a magnet 24 via a coupling element 26. If there is a change in the pressure differential between the pressure areas 20, 22, the pressure plate 14 of the membrane 12 will move in an axial direction x. The magnet 24 which is permanently connected to the pressure plate 14 will follow this movement.

Because the pressure plate 14 is mounted in a radially and axially soft circumferential area 16, the pressure plate 14 will be supported by two pairs of springs 28 according to the invention. One pair of springs 28 comprises two pressure springs 30, 32 each which are coaxially mounted. Thus the spring force will be exerted on the same point, which will ensure a tilt-free arrangement. As may further be gathered from FIG. 1, the springs 32 in pressure chamber 22 are of smaller dimensions than the springs 30 in pressure chamber 20. This allows a presetting to be made with respect to expected pressure differentials. A sensor 34 is provided for the evaluation of the axial displacement of the pressure plate 14. This sensor 34 is separated from the first pressure area 30 by a wall 36. As a result, the AMR sensor will be able to detect the axial displacement of the magnet in a non-contact manner. The sensor is mounted on the housing wall by means of spring 38, which effectively prevents any movement of the sensor in the direction x.

FIG. 1b is a sectional view taken along lines B-B of a differential pressure measuring device 10 according to the invention, in which the circumferential arrangement of the pressure springs 30 can be seen particularly well which are supported by the pressure plate 14. The use of six pairs of springs 28 allows a uniform distribution of the load on the pressure plate and effectively prevents the latter from tipping. This view furthermore shows the sensor 34 as well as the magnet 24. The opening in the housing in which the AMR sensor 34 is inserted is formed as a blind hole, with the wall 36 separating this opening from the pressure area.

FIGS. 1a and 1b are views of an embodiment in which the magnet 24 is eccentrically mounted on the pressure plate. Because the pressure plate 14 is supported by means of several pairs of springs 28 and an AMR sensor 34 is used which is of low sensitivity in the radial direction, even an eccentric arrangement will produce precise measuring results.

FIG. 2 is a view of a differential pressure measuring device 50 which corresponds to the differential pressure measuring device 10 as previously described, in which a plurality of pairs of springs 52 is provided on which a membrane 54 is supported. Contrary to the embodiment of FIG. 1a, the magnet 56 is mounted on a central bar. As a result, the AMR sensor 58 will have to be introduced further into the housing in order to ensure a valid measurement. The arrangement according to the invention thus allows the differential pressure to be determined precisely in a non-contact way.

LIST OF REFERENCE SIGNS

10/50 differential pressure measuring device
12 membrane
14 pressure plate
16 elastic circumferential area
18 transmitter housing
20 pressure area
22 pressure area
24 magnet
26 coupling element
28 pairs of springs
30 pressure spring
32 pressure spring
34 sensor
36 wall
52 pairs of springs
54 membrane
56 magnet
58 sensor

The invention claimed is:

1. Differential pressure measuring device, comprising: a housing; said housing includes a first pressure area and a second pressure area; said first pressure area and said second pressure area are sealed relative to each other; said first pressure area and said second pressure area are separated from each other by a membrane; said membrane comprising a pressure plate; said pressure plate is surrounded by an elastic circumferential volume; said circumferential volume permits axial movement of said pressure plate; an indicator element; said indicator element is permanently connected to said pressure plate; said indicator element is mounted eccentrically on said pressure plate; a sensor; said sensor senses and evaluates the position of said indicator element; said sensor does not contact said indicator element; said sensor is positioned outside said pressure areas; a pair of springs; said pair of springs includes a first spring residing in said first pressure area and a second spring residing in said second pressure area; and, said first spring and said second spring of said pair of springs engaging said pressure plate and exerting an opposing spring force on said pressure plate.

2. Differential pressure measuring device of claim 1, further comprising at least three pairs of springs.

3. Differential pressure measuring device of claim 1, wherein said springs are the same kind.

4. Differential pressure measuring device of claim 1, further comprising: said pair of springs comprises two coaxially mounted coil springs.

5. Differential pressure measuring device of claim 1, wherein said pair of springs is distributed along a circumference.

6. Differential pressure measuring device of claim 1, in the axial direction, the indicator element is located between the ends of the spring pair which are further away from the pressure plate.

7. Differential pressure measuring device of claim 1 wherein said indicator element is a magnet.

8. Differential pressure measuring device of claim 1 wherein said sensor is an AMR sensor.

9. Differential pressure measuring device of claim 1 wherein said sensor is mounted outside the pressure areas, said sensor being separated by a wall which is part of a housing.

10. Differential pressure measuring device of claim 1 wherein plural sensors are distributed along the circumferential direction.

* * * * *